United States Patent Office 3,676,162
Patented July 11, 1972

3,676,162
MAGNESITE REFRACTORY MATERIALS
Ernst Mahler, Wiesbaden-Bierstadt, Germany, assignor to Didier-Werke A.G., Wiesbaden, Germany
No Drawing. Filed June 10, 1970, Ser. No. 45,243
Claims priority, application Great Britain, June 21, 1969, 31,464/69
Int. Cl. C04b 35/04
U.S. Cl. 106—58    11 Claims

ABSTRACT OF THE DISCLOSURE

In the particular embodiments of the invention described herein, a basic refractory material for lining steel converters and the like comprises a granular mixture of sintered magnesia having 80% of the granules between 1 mm. and 10 mm., bonded together with sodium polyphosphate or magnesium sulfate, and impregnated with liquid tar.

---

The present invention relates to a method of manufacturing chemically bonded unfired magnesite refractories for metallurgical vessels, in particular for converters in the steel industry, and to the product.

The lining of such vessels usually consists of basic refractory materials and is often subject to very severe conditions due to the combined effect of very high temperatures, thermal and mechanical stresses, and chemical attack. The principal basic materials used are fired magnesite bricks (of high MgO content) subsequently impregnated with tar or carbonaceous material, and tar bonded magnesite bricks (of high MgO content) which may be subsequently tempered.

Of these two materials the first are bricks in which magnesite grains of high purity form strong ceramic bonds by sintering at high temperature. They have great mechanical strength but suffer in use from brittle fracture in layers mainly parallel to the hot face of the brick, in spite of the impregnation with carbonaceous material, and this damage may even occur in the course of the first heating-up of the lining to its operational temperature.

When the second of the above-mentioned materials, i.e. tar bonded unfired magnesite bricks, are used, particular care has to be taken during the heating-up period of a new lining, because of transient mechanical weakening of the brick in a temperature range up to 500° C. when the tar undergoes a process of thermal cracking. Moreover, the desired ceramic bonding of the magnesia grains by sintering in situ is substantially delayed, which is thought to be due to interference by the intergranular deposits of carbon in the brick. For these reasons, such bricks are subject to strong wear.

There have been attempts to improve such tar bonded bricks by using a chemical bonding agent. But such attempts have failed because such bricks could not be properly impregnated with tar.

The present invention provides a method for the manufacture of magnesite bricks, which comprises forming them from a granular mixture of sintered magnesia with the addition of a chemical bonding agent, drying them, and subsequently impregnating them with a medium having a high carbon content, wherein the granular mixture contains about 15% of granules having a grain size below 0.1 mm., and as much as 80% of granules having a grain size between 1 mm. and 10 mm.

The invention also provides a method for the manufacture of magnesite bricks, which comprises forming them from a granular mixture of sintered magnesia with the addition of a chemical bonding agent, drying them, and subsequently impregnating them with a medium having a high carbon content, wherein the granular mixture contains 10 to 20% of granules having a grain size below 0.1 mm., 0 to 15% of granules having a grain size between 0.1 mm. and 1 mm., and more than 65% of granules having a grain size above 1 mm.

The percentages referred to herein are by weight, and the expression "brick" includes blocks.

It has been found that bricks formed from such a granular mixture of sinter magnesia and chemically bonded can be satisfactorily impregnated with tar and have improved properties and a longer life.

The bricks according to the invention may be manufactured from a granular mixture containing grain sizes of more than 7 mm. and up to about 12 to 15 mm., and may be impregnated with up to 8% tar or equivalent carbonaceous medium.

In spite of the coarser structure bricks according to the invention do not have a higher porisity, i.e. the bulk density of the matrix prior to impregnation is substantially the same as that of chemically bonded magnesite bricks having a normal dense grain distribution.

Preferably, a magnesia sinter with a low content of not more than 2% $Fe_2O_3$ is used.

A suitable chemical bonding agent is an aqueous solution of alkali phosphate, in particular of sodium polyphosphate with a chain length of 21 as manufactured, for example, by the F. M. C. Corporation New York 17 (see also U.S. Pat. 3,127,238). Other known chemical bonding agents like magnesium sulphate may be used. but compounds, like chromic acid $CrO_3$ which are easily produced by a carbonaceous material and liberate oxygen in the process, should be avoided.

This invention includes a chemically-bonded, unfired, magnesite brick having a matrix consisting of a chemically-bonded granular mixture of sintered magnesite, said matrix being impregnated with a medium having a high carbon content, wherein the granular mixture contains 10 to 20% of granules having a grain size below 0.1 mm., 0 to 15% of granules having a grain size between 0.1 mm. and 1 mm., and more than 65% of granules having a grain size above 1 mm.

The invention will be more fully understood by reference to the following examples. The following table compares a suitable granular mixture according to the invention (A) with the normal granular mixture used for known tar bonded magnesite bricks (B).

| | A | B |
|---|---|---|
| Grain size (mm.): | | |
| Under 0.1 | 15 | 22 |
| 0.1–1 | 8 | 26 |
| 1–3 | 30 | 22 |
| 3–6 | 35 | 18 |
| 6–12 | 12 | 12 |

Sintered magnesia containing 95% MgO and low in iron oxide and a grain distribution according to A is properly mixed with 2% by weight of sodium polyphosphate "Glass H" and a suitable amount of water. The mass is then pressed into the desired shape under a pressure of about 1000 kg./cm.$^2$ and dried. Subsequently, the bonded matrix is impregnated with a tar containing 80% pitch and having a tar softening temperature of 50° C. (according to the method of Kraemer-Sarnan). The impregnation is carried out at a brick temperature of 180° C., for example.

Magnesite bricks according to the invention have a compressive strength of as much as 100 to 300 kg./cm.$^2$, and the cold compressive strength following firing (as when in use) in a reducing atmosphere at 1550° C. is at least 300 kg./cm.$^2$.

If, on the other hand, the known tar bonded magnesite bricks are formed as usual from the granular mixture B of the above table by adding 6 percent tar (containing 80% pitch; tar softening point 35° C.) and mixing it at about 120° C. in the usual manner, very different results are obtained. In the temperature range between 100° and 300° the bricks are very weak and have a compressive strength of 10 kg./cm.$^2$ or less. This value increases to 300 kg./cm.$^2$ at 500° C. After firing at 1550° C. in reducing atmosphere values of the cold compressive strength of 200 up to about 300 kg./cm.$^2$ are obtained.

It is important that prior to impregnation the bricks according to the invention should have relatively large average pore size in order to facilitate the impregnation of the liquid tar. The bricks made as described have, after forming and drying a gas permeability of more than 50 nanoperm (1 nanoperm=10$^{-9}$ perm, 1 perm corresponds to a permeability of 1 cm.$^3$/cm.$^2$/sec. for a thickness in the flow direction of 1 cm., a pressure difference of 1 dyne/cm.$^2$ and a gas medium having a viscosity of 1 poise). The open pores, i.e. those which are accessible to inpenetration, have mostly an average diameter of more than 50 microns.

In contrast, the known chemical bonded basic bricks are very dense and have a low porosity. The same applies to known fired magnesite bricks which prior to impregnation show a permeability of about the order to 10 nanoperm and average open pore sizes of less than 50 microns.

It was found that a really satisfactory impregnation of chemically bonded bricks is only achieved according to the invention, though the reasons are not fully understood.

A lining with bricks according to the invention does not display the weaknesses either of fired magnesite bricks, subsequently impregnated with tar, i.e. brittle fracture, or of tar bonded magnesite bricks, i.e. the transient mechanical weakening during the heating up period and the delay in sintering at the operational temperature. Generally bricks according to the invention have given excellent over-all results with regard to wear and tear, in spite of the fact that the method proposed is much lower in cost than conventional methods, as neither firing at high temperature nor tempering after impregnation is required.

What I claim is:

1. A chemically-bonded, unfired, magnesite brick having a matrix consisting of chemically-bonded granular mixture of sintered magnesite, said matrix being impregnated with a medium having a high carbon content, wherein the granular mixture contains 10 to 20% of granules having a grain size below 0.1 mm., to 0 to 15% of granules having a grain size between 0.1 mm. and 1 mm. and more than 65% of granules having a grain size above 1 mm.

2. A brick according to claim 1, wherein the matrix is impregnated with a tar content of 5 to 8%.

3. A brick according to claim 1 wherein the granular mixture contains about 15% of granules having a grain size below 0.1 mm., and up to about 80% of granules having a grain size between 1 mm. and 10 mm.

4. A brick according to claim 1 wherein the medium with a high carbon content is tar.

5. A brick according to claim 1 wherein the granular mixture contains 0% to 10% of granules having a grain size between 0.1 mm. and 1 mm.

6. A brick according to claim 1 wherein the granular mixture contains 70% to 90% of granules having a grain size above 1 mm.

7. A brick according to claim 1 wherein the granular mixture contains grain sizes of between 7 mm. and 15 mm.

8. A brick according to claim 1 in which the sintered magnesite has not more than about 2% Fe$_2$O$_3$.

9. A brick according to claim 1 which also comprises a binding agent of alkali phosphate.

10. A brick according to claim 9 wherein the alkali phosphate is sodium phosphate.

11. A brick according to claim 1 wherein the granular mixture has a permeability of over 50 nanoperm and an average open pore size above 50 microns.

References Cited

UNITED STATES PATENTS

| 3,141,784 | 7/1964 | King et al. | 106—58 |
| 3,304,187 | 2/1967 | Limes et al. | 106—58 |

JAMES E. POER, Primary Examiner

U.S. Cl. X.R.

106—56